No. 611,392. Patented Sept. 27, 1898.
H. A. PIKE.
TRACK SANDING APPARATUS.
(Application filed Oct. 25, 1897.)
(No Model.) 2 Sheets—Sheet 1.
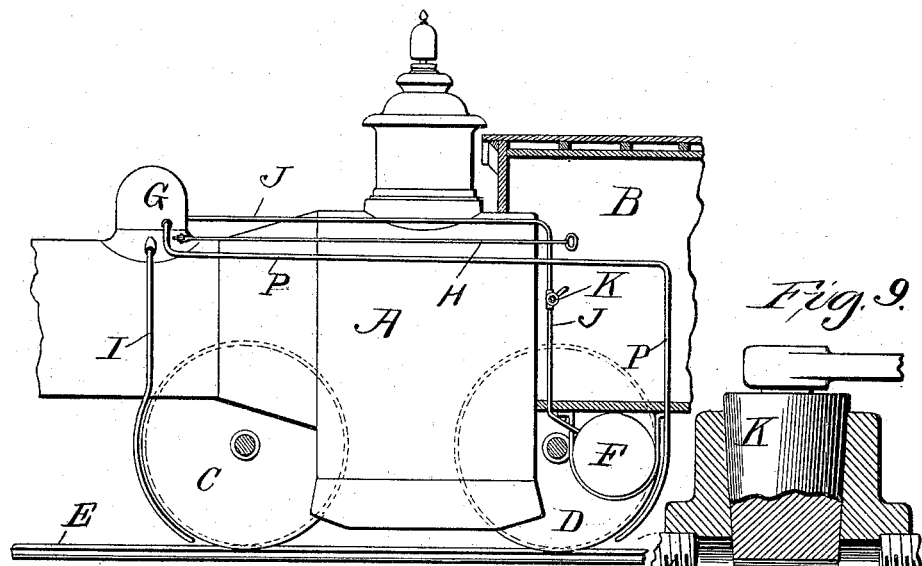
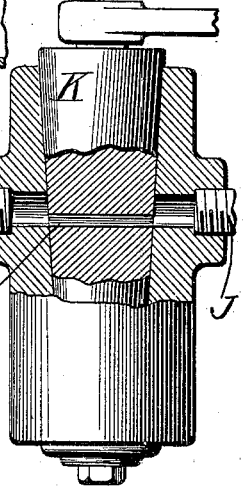
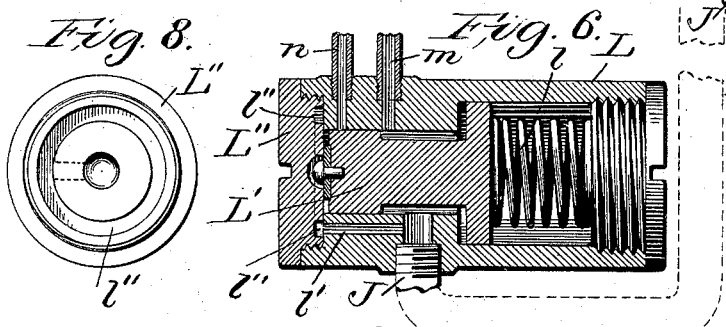
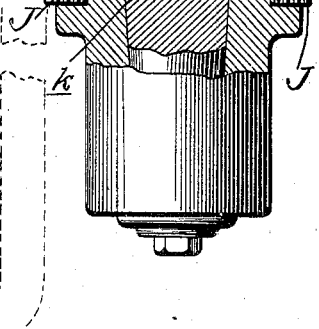
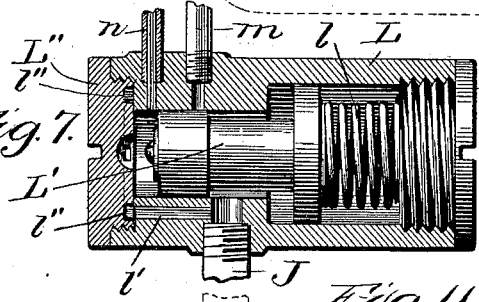
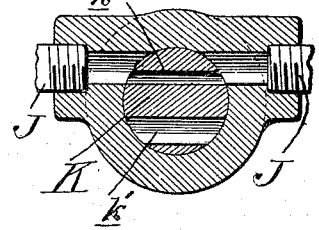
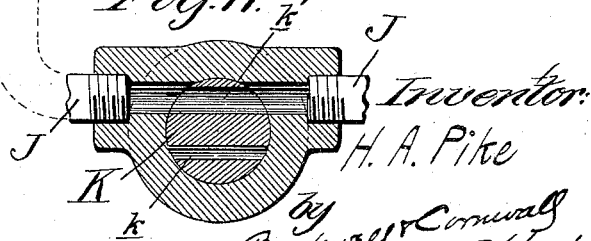
Attest:
G. A. Pennington
Ralph Kalish
Inventor:
H. A. Pike
by Bakewell & Cornwall
Atty's No. 611,392. Patented Sept. 27, 1898.
H. A. PIKE.
TRACK SANDING APPARATUS.
(Application filed Oct. 25, 1897.)
(No Model.) 2 Sheets—Sheet 2.
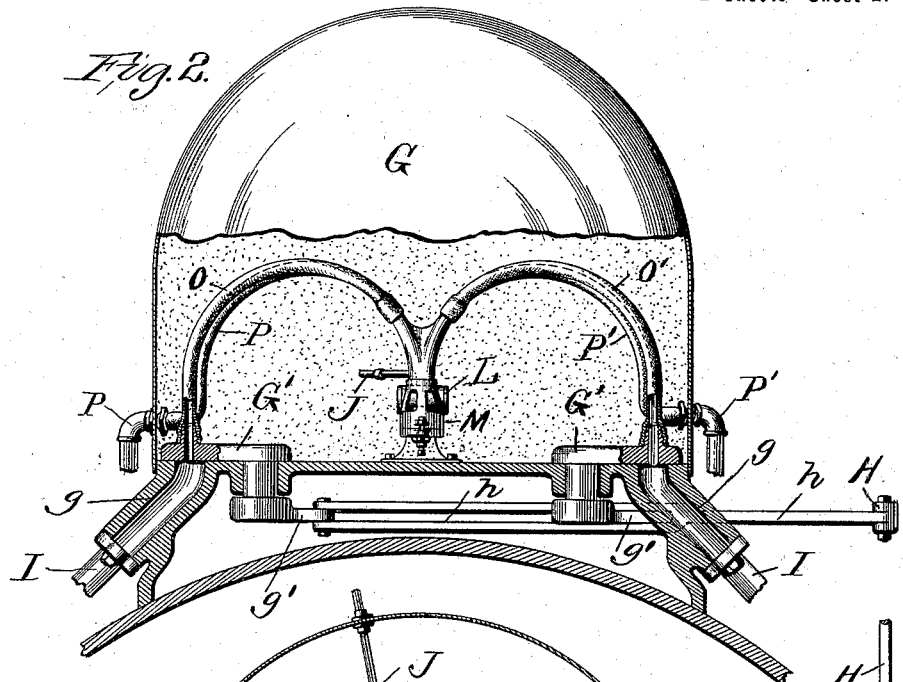
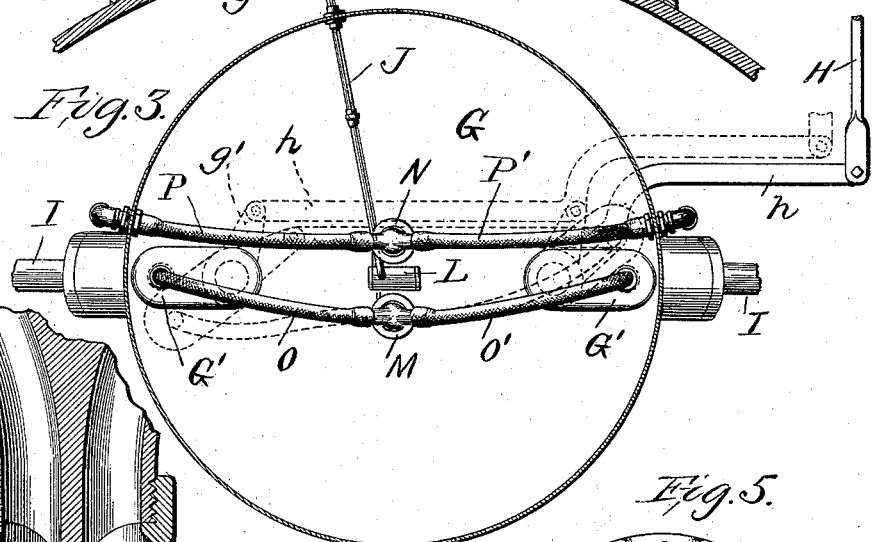
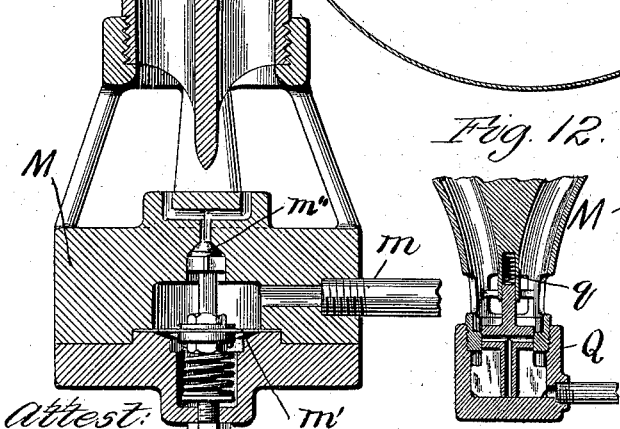
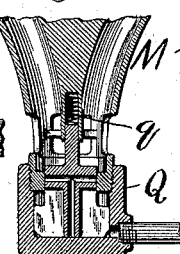
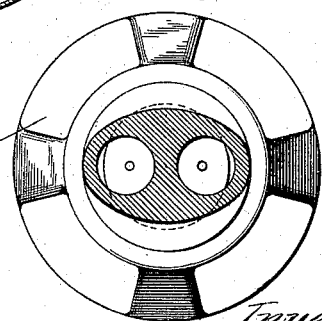
Attest:
G. A. Pennington.
Ralph —
Inventor:
H. A. Pike
by Bakewell & Cornwall
Attys.

UNITED STATES PATENT OFFICE.

HARVEY A. PIKE, OF ST. LOUIS, MISSOURI.

TRACK-SANDING APPARATUS.

SPECIFICATION forming part of Letters Patent No. 611,392, dated September 27, 1898.

Application filed October 25, 1897. Serial No. 656,314. (No model.)

*To all whom it may concern:*

Be it known that I, HARVEY A. PIKE, a citizen of the United States, residing in the city of St. Louis, State of Missouri, have invented a certain new and useful Improvement in Track-Sanding Apparatus, of which the following is a full, clear, and exact description, such as will enable others skilled in the art to which it appertains to make and use the same, reference being had to the accompanying drawings, forming part of this specification, in which—

Figure 1 is a view illustrating a portion of a locomotive and showing the sand-pipes in position. Fig. 2 is a view of the sand-box, the near side wall being removed to more clearly show the interior. Fig. 3 is a top plan view illustrating the position of the apparatus in the sand-box. Fig. 4 is an enlarged vertical sectional view through one of the double-blast devices. Fig. 5 is a top plan view thereof, the sand-delivery-pipes coupling being shown in section. Fig. 6 is a sectional view through the air-distributing device or valve. Fig. 7 is a similar view showing the valve in a different position. Fig. 8 is an inside face view of the head of the valve-casing. Fig. 9 is a vertical sectional view through the engineer's valve. Fig. 10 is a horizontal sectional view through the engineer's valve. Fig. 11 is a similar view showing the valve in a different position. Fig. 12 is a modified form of the double-blast device.

This invention relates to a new and useful improvement in pneumatic track-sanding apparatus, the object being to construct a cheap and simple device of the character described whereby the engineer will have full control thereover to sand the front or the back drivers, or both, at will and at the same time be at liberty to operate the usual valve to open the gravity-passage should the blast-creating pressure be too low for use.

Another object of the invention is to provide a distribution-valve which when a certain pressure is admitted thereto will direct said pressure to one set of drivers—say the front—and when another pressure is admitted thereto will shut off pressure from said front drivers and direct said pressure to the back drivers.

With these objects in view the invention consists in the novel construction of the blast-nozzles, in the provision of a flexible pipe for receiving the sand from said blast-nozzles and delivering it through the valve for and into the gravity-passage, in the novel construction of the engineer's valve, and, finally, in the novel construction, arrangement, and combination of the several parts, all as will hereinafter be described and afterward pointed out in the claims.

In the drawings, A indicates a locomotive-boiler; B, the engineer's cabin; C, the front driving-wheels; D, the rear driving-wheels; E, the track or rails, and F a pressure-reservoir, preferably an air-reservoir, for the brake system.

G indicates the sand-box, which is provided with the usual sand-passages $g$ in its bottom, which are controlled by valves G', said valves having crank-arms $g'$ on their pivot-studs below the sand-box, which are connected by a rod $h$, secured to an operating-rod H, leading to the engineer's cabin. By operating rod H the passage $g$ will be opened, as shown by dotted lines in Fig. 3, permitting the sand to fall by gravity through the pipes I to the rails in front of the front drivers C. This construction is well known and in use on many engines, being known as the "gravity feed" in contradistinction to "pressure feed."

J is a pressure-supply pipe leading from the reservoir F to a distribution-valve, preferably located in the sand-box.

K is a valve in pipe J for controlling the passage of pressure therethrough. This valve K is shown in the form of a plug-valve and is provided with two passages $k$ and $k'$, which are adapted to register with pipe J to admit two pressures through said pipe—one, a low pressure, through the small passage $k$ (when it is desired to sand the front drivers by pressure) and the other, high pressure, through the large opening $k'$, (when it is desired to sand the rear drivers and shut off pressure from the front drivers or when it is desired to sand both drivers, the back by pressure and the front by gravity.)

Valve K is located so as to be within easy reach of the engineer and is provided with a suitable handle by which it may be operated.

Of course it is understood that said valve can be turned so as to entirely close pipe J when it is desired not to use the sander.

The distribution-valve, to which pipe J leads, consists of a casing or cylinder L, bored to two different diameters, in which is arranged a piston or plunger L', formed with corresponding diameters to fit the cylinder. A spring $l$ is behind the larger head of the plunger to normally keep the same at one end of the cylinder. Pipe J leads into the cylinder between the two heads on this piston, and should the pressure be insufficient to force the piston back against its spring, as when passage $k$ is in register, said pressure will pass out through a duct $m$, (see Fig. 6,) which duct $m$ leads to the blast-nozzle of the front-driver-sanding device.

Should passage $k'$ be in register, so as to admit a high pressure through pipe J, then said high pressure will force the piston L' back, compressing its spring, closing port $m$ and opening port $n$, which leads to the blast-nozzle of the back-driver-sanding device.

I preferably provide a by-pass $l'$ in the cylinder which is constantly open to pressure, said pass opening into a concentric groove $l''$ in cylinder-head L''. A centrally-located port communicates with this concentric groove, (see dotted lines, Fig. 8,) said central port being closed by a leather washer on the small end of the piston when said piston is in its normal position, (see Fig. 6,) but which opens said central port when said piston is moved against its spring. (See Fig. 7.)

Duct $m$ leads to a suitable casting M, in which are formed the nozzles for the front drivers. Upon being introduced in casting M the pressure will force down a diaphragm $m'$ and open valve $m''$, which permits the pressure to pass beyond the valve and be divided, so as to form two blasts, which force the sand flowing through the openings in the side of the casting up into diverging openings in a Y-coupling secured to the casting.

Suitable means are employed for adjusting the tension on the under side of the diaphragm, so that valve $m''$ will close, in the absence of pressure on top of the diaphragm, to exclude sand.

Duct $n$ leads to a casting N, which is in all respects the same as casting M, and therefore I deem it unnecessary to give a repetition of the description of casting M with reference to casting N.

To the Y-coupling on casting M are connected flexible pipe-sections O and O', whose other ends are connected, respectively, to nipples formed on the valves G'. When valves G' close the passages $g$, so that no sand can pass therebeyond by gravity, then the pipes O and O' register with said passages.

To the Y-coupling on casting N are connected pipes P and P', which extend through the side walls of the sand-box, said pipes terminating above the rails and behind the back drivers D. I have shown a section of pipes P and P' as being made of flexible material; but this is not necessary, as they do not have to accommodate themselves to any movement, as do the sections O and O', when the valves G' move.

The operation of the device is as follows: When valve K is turned to register passage $k$ with pipe J, a low pressure is admitted to the distribution-valve, whose piston, not being thrown by such low pressure, will permit the passage of the pressure through duct $m$, where when it enters the chamber above the diaphragm will depress said diaphragm, causing the valve $m''$ to open the passage to the blast-nozzles and direct two blasts into the two passages in the Y-coupling to sand both rails in front of the front drivers. When valve K is turned to register passage $k'$ with pipe J, a high pressure is admitted to the distribution-valve, whose piston is thrown, cutting off duct $m$ and opening duct $n$, which leads to casting N, when the pressure passing through said duct will depress the diaphragm in casting N, open its connected valve, and create two blasts, both of which force sand into the branches of the Y-coupling and into the pipes P and P', respectively, to sand both rails behind the back drivers. Should the pressure be too low to be useful in blast form to effect the sanding of the rails, the front drivers can be sanded by opening the valve G' manually. Both drivers can be sanded by opening valves G' to sand the rails in front of the front drivers and turning valve K to register its passage $k'$ with the pipe J, as just described.

From the above it will be seen that my improved sanding device can be applied to engines provided with the usual manually-operated sanding apparatus with slight changes in the latter, and, furthermore, by leaving the manually-operated sanding apparatus in position and not in the least interfering with its operation by the engineer when he so desires the engineer can sand the tracks as he pleases.

In Fig. 12 I have shown a modified form of blast device in which I dispense with a diaphragm and use a plunger operating in two diameters in the casting marked Q. This plunger is formed with a central duct which connects with a cross-duct at its top. When pressure is admitted under the plunger, the plunger is raised, and the blasts of air going out through the cross-duct in the top will strike in two grooves which direct the blasts upward into the coupling. A suitable spring $q$ is arranged to normally hold the plunger in its lower position to close the cross-duct and prevent the entrance of sand.

I am aware that many minor changes in the construction, arrangement, and combination of the several parts of my improved sanding apparatus can be made and substituted for those herein shown and described without in the least departing from the nature and principle of the invention.

Having thus described my invention, what I claim, and desire to secure by Letters Patent, is—

1. The combination with two blast-nozzles, of sand-delivery pipes leading to points above the rails in front of the front drivers and behind the back drivers, a distribution-valve for directing pressure to either of said nozzles, a pressure-pipe leading to said distribution-valve, and a valve for controlling the passage of pressure through said pipe, said valve being located within the reach of the engineer; substantially as described.

2. The combination with a sand-box and two blast-nozzles, of sand-delivery pipes leading to points above the rails in front of the front drivers and behind the back drivers, a distribution-valve arranged in the sand-box for directing pressure to one of said nozzles and shutting off pressure from the other of said nozzles, and vice versa, a pressure-pipe leading to said distribution-valve arranged in the cabin of the locomotive, and a valve for controlling the passage of pressure in said pipe; substantially as described.

3. The combination with two blast-nozzles, of sand-delivery pipes leading to points above the rails in front of the front drivers and behind the back drivers, a distribution-valve for directing pressure to one of said nozzles and shutting off pressure from the other of said nozzles, and vice versa, a pressure-pipe leading to said distribution-valve, and a valve, having two passages of different sizes, for controlling the passage of pressure in said pipe; substantially as described.

4. The combination with two blast-nozzles, of sand-delivery pipes leading to points above the rails in front of the front drivers and behind the back drivers, a distribution-valve comprising a cylinder, bored to two diameters, and a piston operating therein, a pressure-pipe leading to said distribution-valve, connections between said distributing-valve, and blast-nozzles and means for causing varying pressures in said pipe, before said pressures reach the distribution-valve; substantially as described.

5. The combination with a sand-box, of blast-nozzles arranged therein, sand-delivery pipes leading from said blast-nozzles to points above the rails, a distributing-valve for directing pressure to one of said nozzles and shutting off pressure from the other of said nozzles, and vice versa, a pressure-pipe leading to said distributing-valve, a valve for controlling the passage of pressure through said last-mentioned pipe, and means arranged in said valve for varying the pressure admitted to said pipe leading to said distributing-valve, substantially as described.

6. The distribution-valve comprising a cylinder, bored to two different diameters, a piston formed with heads operating in said bores, said cylinder being provided with an inlet-port which constantly opens into the cylinder between the two piston-heads, a duct which also opens between said heads when the piston is in its normal position, and a duct which is normally closed to pressure but which is opened when the piston is actuated, and means for normally holding the piston in a position in which said last-named duct is closed; substantially as described.

7. The distribution-valve comprising the following elements in combination: a cylinder bored to two different diameters, said cylinder being formed with an inlet-port, ducts $m$ and $n$, and a by-pass $l'$; a cylinder-head formed with a concentric groove, and a central opening communicating with said concentric groove; a piston operating in the two bores of the cylinder, said piston closing the central opening in the cylinder-head, and the duct $n$ when in its normal position, the duct $m$ being normally open to the inlet-port, but closed when the piston is actuated; and a spring arranged behind the larger head of the piston; substantially as described.

8. The combination with a pressure-pipe, of a casting M, a diaphragm arranged in said casting, a valve attached to said diaphragm for closing a passage or duct in said casting, said passage or duct leading to two blast-openings, a Y-coupling secured to the casting above said blast-openings, and sand-delivery pipes leading from the branches of said Y-coupling, substantially as described.

9. The combination with a pressure-pipe, of a casting formed with a chamber, into which chamber said pressure-pipe leads, a diaphragm arranged in said chamber, a spring under said diaphragm, a valve secured on the upper side of said diaphragm, for closing a duct in the casting, said duct leading to two blast-openings, a Y-coupling secured to said casting, the two passages in said Y-coupling registering with the blast-openings and pipes leading from the branches of said Y-coupling for delivering sand to each rail; substantially as described.

10. The combination with a sand-box formed with an opening for the passage of sand, of a valve-closure for said opening, means for creating a blast of sand, and a pipe connected to said valve-closure for conveying said blast to and through said valve, substantially as described.

11. The combination with a sand-box formed with an opening for the passage of sand, of a valve for closing said opening, and means connected to, and movable with, said valve, for delivering sand through said valve, and into the passage controlled thereby; substantially as described.

12. The combination with a sand-box formed with an opening for the passage of sand, of a valve for closing said opening, a sand-blast apparatus, and a flexible pipe leading from said sand-blast apparatus, and connected to, said valve, to deliver sand into the passage controlled by said valve; substantially as described.

13. The combination with a sand-box formed with openings in its bottom for the passage of sand, valves for closing said openings, said valves being formed with openings which register with the sand-delivery passages when the valves are closed, flexible pipes connected to said valves, and a sand-blast apparatus to which said flexible pipes are connected; substantially as described.

14. The combination with a sand-box having passages leading therefrom, manually-operated valves for closing said sand-passages against the entrance of gravitating sand, a pneumatic sanding apparatus, and flexible pipes connecting said apparatus with said manually-operated valves, to deliver sand through openings in said valves into the sand-passages; substantially as described.

15. The combination with a sand-box having sand-passages, and manually-operated valves for controlling said passages, of a source of air-pressure supply, a pipe leading therefrom, a valve for effecting varying pressures in said pipe, a distribution-valve to which said pipe leads, pneumatic sanding devices arranged in the sand-box, which devices are operated by pressure directed thereto by said distribution-valve, one of said sanding devices being piped to deliver sand to behind the back drivers, and flexible pipes connecting the other of said sanding devices with openings in the manually-operated valves, whereby, sand may be forced into the passages, to be delivered in front of the front drivers, or said valves may be manually operated to open said passages and permit the sand to fall by gravity; substantially as described.

In testimony whereof I hereunto affix my signature, in the presence of two witnesses, this 18th day of October, 1897.

HARVEY A. PIKE.

Witnesses:
HUGH K. WAGNER,
F. R. CORNWALL.